Dec. 22, 1942.  H. SUKOHL  2,305,817
STRUCTURAL ELEMENT, PARTICULARLY FOR AIRCRAFT
Filed Aug. 15, 1939
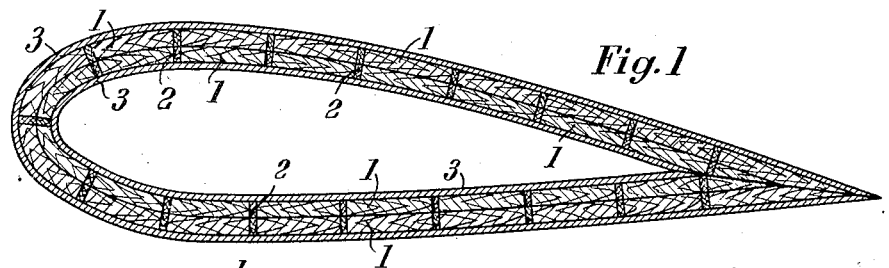
Fig.1
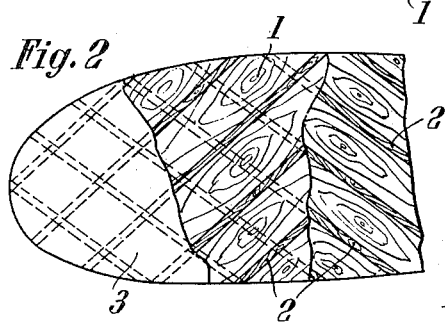
Fig.2
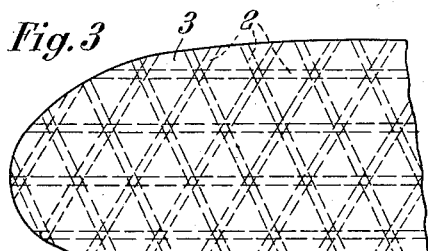
Fig.3
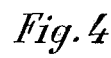
Fig.4
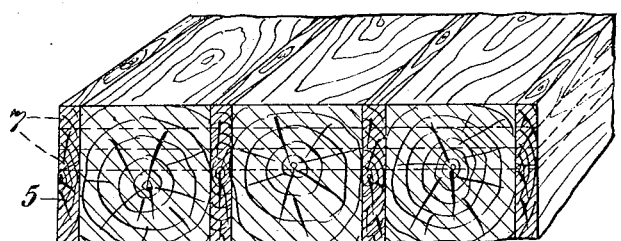
Fig.5     Fig.6
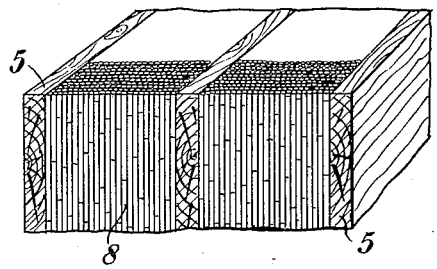
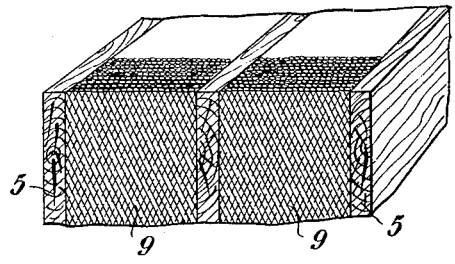
Fig.7     Fig.8
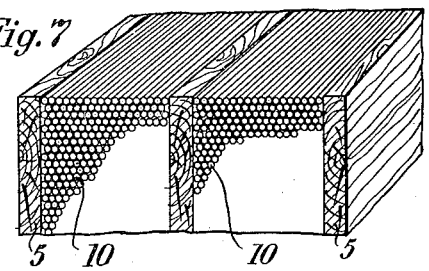
Inventor:
Heinrich Sukohl
by Frank Reinhold
Attorney Patented Dec. 22, 1942

2,305,817

UNITED STATES PATENT OFFICE 2,305,817

STRUCTURAL ELEMENT, PARTICULARLY FOR AIRCRAFT

Heinrich Sukohl, Berlin-Waidmannslust, Germany; vested in the Alien Property Custodian Application August 15, 1939, Serial No. 290,170
In Germany February 26, 1937

9 Claims. (Cl. 20—91)

My invention relates to improvements in structural elements, particularly for aircraft, and more particularly in structural elements which are composed of frame members of strong material and filling members of light material connected with the said strong members for filling the spaces. The object of the improvements is to provide a structural element of this type which is particularly light, and which is able to withstand high bending stresses and also stresses acting perpendicularly to the surface thereof. With this object in view my invention consists in composing the structural element from several superposed plies each comprising elongated members of high tensile and bending strength, and light filling material between the said elongated members, the said plies being superposed so that the elongated members cross one another. In the preferred embodiment of the invention the individual plies comprise the said elongated members and filling members between the same which extend continuously the whole length of the elongated members. The said light material may consist for example of light wood, such as balsa wood, artificial sponge like material, fibre material, straw or tubular fibre material. The individual plies are preferably manufactured by first manufacturing a block composed of boards having the grain running in one direction and filling blocks of light material between the said boards and glued thereto, and thereafter sawing the said block longitudinally of the said grain to provide panels of the desired thickness each comprising members of high tensile strength and filling members of light material between the same.

For the purpose of explaining the invention several examples embodying the same have been shown in the accompanying drawing in which the same reference characters have been used in all the views to indicate corresponding parts. In said drawing, Fig. 1 is a sectional elevation showing the wing of an aeroplane made from my improved structural element, Fig. 2 is a fragmentary top plan view on a reduced scale showing a portion of the said wing, the superposed plies being partly broken away, Fig. 3 is a similar plan view showing a modification, Fig. 4 is a fragmentary perspective view showing a block from which the superposed panels are cut, the said block being shown in section, and Figs. 5 to 8 are similar perspective views showing modifications.

In the construction shown in Fig. 1 the structural element is composed of two superposed plies each consisting of elongated members 2 of high tensile strength and filling members 1 of light material. The elongated members may consist for example of wooden bars having the grain running in longitudinal direction, and the intermediate filling members 1 may consist for example of balsa wood. The elongated members extend all over the length of the ply and the light filling material 1 likewise extends without interruption or break across the ply from one end to the other. The members 1 and 2 are connected with one another by glueing, and the superposed plies are likewise glued to each other. Preferably the structure has a protective coating 3 made from a suitable artificial material such as artificial resin, wood veneer, impregnated fibre material and the like.

As is shown in Fig. 2 the plies are superposed so that the elongated members 2 cross each other, and where the number of the plies is more than two they are preferably superposed so that as far as possible all the elongated members of the superposed plies cross each other at superposed points, as is indicated in Fig. 3.

Figs. 4 to 8 illustrate the preferred method of manufacturing the superposed plies. As is shown in Fig. 4, at first a block is built which is composed of boards 5 of high tensile strength having the grain running in longitudinal direction, and filling members 6 of light material such for example as balsa wood, the said boards and members of light material extending without break all over the length of the block, and the parts being connected with one another by glueing. From the said block panels 7 of suitable thickness are cut longitudinally of the boards by sawing, and the said panels are superposed and connected with each other in the manner described with reference to Figs. 1 and 2. The boards 5 may consist for example of pine, ash, or other wood of high tensile strength and elasticity. The filling members 6 which are said to be made from balsa wood may also be made from artificial material, such as sponge material, fibre material, or the blades from straw connected with each other by glueing. In Fig. 5 I have shown an example in which the filling members 8 consist of blades of straw disposed perpendicularly to the grain of the boards 5. Fig. 6 shows a modification in which the filling members consist of blades of straw 9 disposed diagonally of the boards and so as to cross each other in alternate layers. In Fig. 7 I have shown another modification in which the blades of straw 10 are disposed longitudinally of the boards. Fig. 8 shows another modification in which the filling members 11 are composed of layers of straw disposed in the alternate layers transversely of each other.

The superposed plies made as described herein may have any desired thickness, according to the character of the construction made therefrom. Where the walls of the said construction are plane the plies may be comparatively thick, and where curved walls are to be made, the plies are smaller in thickness so that they may be bent into the desired shape, if necessary by first treating the same with steam. For many purposes the plies have a thickness from ¼" to ¾", more or less.

I have found that a structural element made as described has high tensile and bending strength, and that it is not bulged by forces acting perpendicularly to its surface.

I claim:

1. The herein described structural element composed of superposed plies connected with each other and each comprising elongated members more than two of high tensile and bending strength extending through the thickness of said plies, and filling members intermediate said elongated members and consisting of light material, the said plies being superposed with the elongated members crossing one another.

2. A structural element as claimed in claim 1 composed of a plurality of superposed plies more than two, in which the plies are superposed so that substantially all the elongated members of the plies cross one another at superposed points.

3. A structural element composed of elongated members of high tensile and bending strength, and members filling the spaces between said elongated members and consisting of blades of straw glued to one another and to said members of high tensile strength.

4. A structural element as claimed in claim 3, in which the blades of straw are disposed longitudinally of said elongated members.

5. A structural element as claimed in claim 3, in which the blades of straw are disposed transversely of said elongated members.

6. A structural element as claimed in claim 3 in which the blades of straw are disposed diagonally of said elongated members and so as to cross each other in alternate layers.

7. A structural element as claimed in claim 3, in which the blades of straw are disposed in alternate layers so that they run respectively longitudinally and transversely of said elongated members.

8. A structural element as claimed in claim 1, in which the elongated members consist of wood of high tensile and bending strength, and the filling members of light wood.

9. A structural element as claimed in claim 1, in which the elongated members consist of wood of high tensile and bending strength, and the filling members of suitably connected blades of straw.

HEINRICH SUKOHL.